June 6, 1944.  H. L. KRAEFT  2,350,468
BICYCLE CRANK HANGER ASSEMBLY
Filed Nov. 4, 1941  2 Sheets-Sheet 1
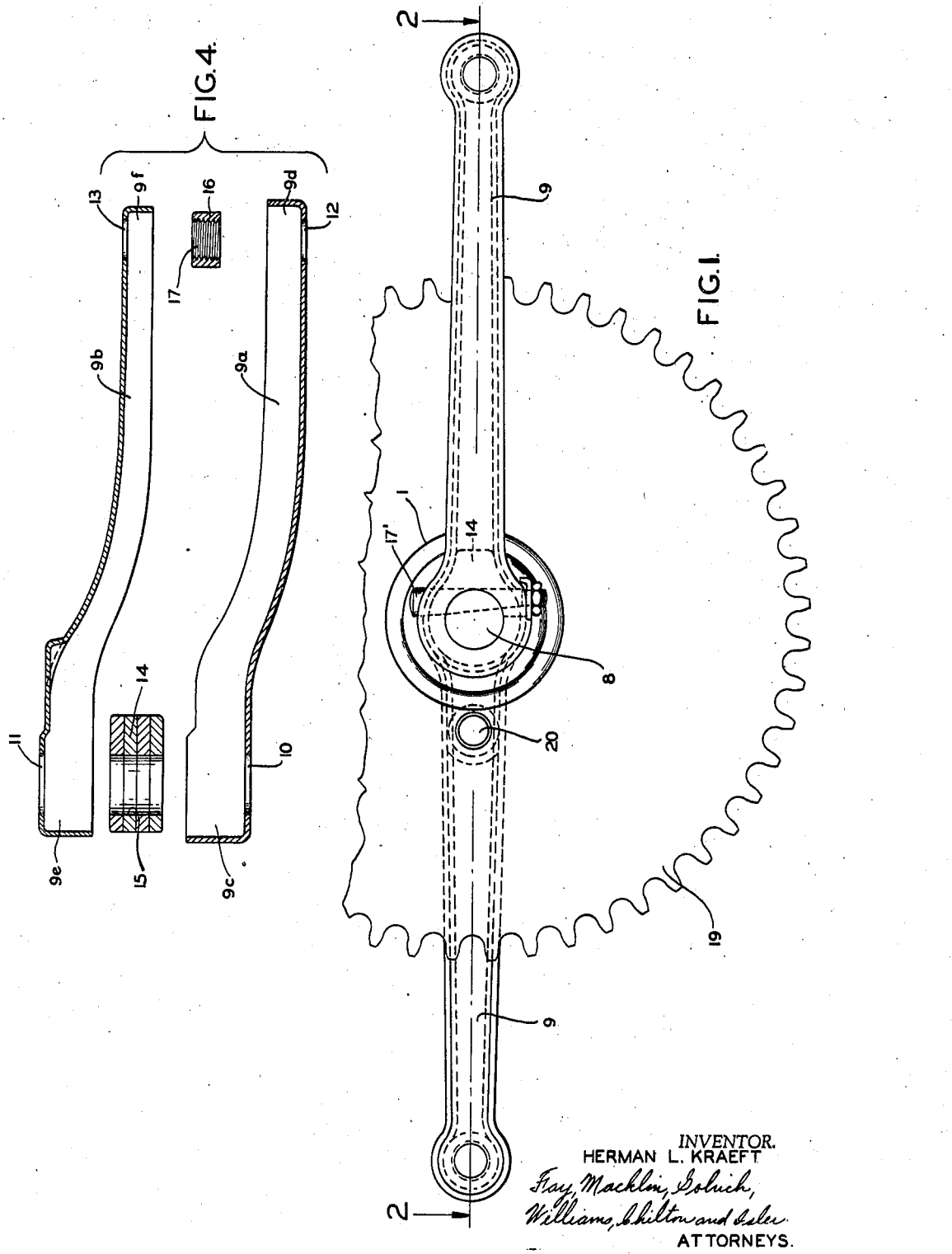
INVENTOR.
HERMAN L. KRAEFT
ATTORNEYS.

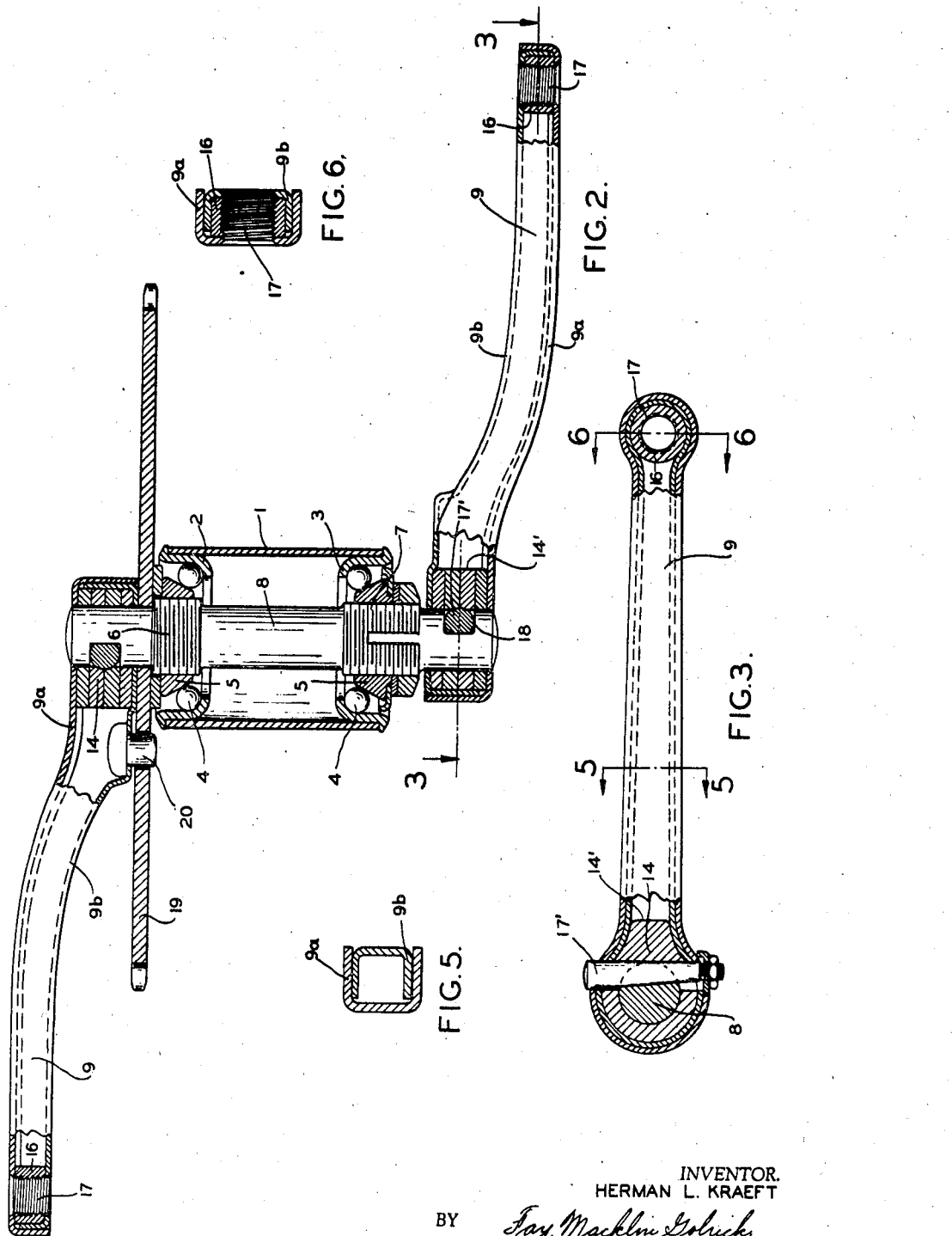

Patented June 6, 1944

2,350,468

UNITED STATES PATENT OFFICE 2,350,468

BICYCLE CRANK HANGER ASSEMBLY

Herman L. Kraeft, Cleveland Heights, Ohio, assignor to The Murray-Ohio Manufacturing Company, Cleveland, Ohio, a corporation of Ohio Application November 4, 1941, Serial No. 417,799

4 Claims. (Cl. 74—594.1)

This invention relates, as indicated, to a bicycle crank hanger assembly.

It has heretofore been customary to construct bicycle crank hangers in either one piece, consisting of a crank shaft portion and two crank portions, or of three pieces consisting of a crank shaft and separate hangers secured together in a suitable manner.

In either case, the pieces were usually solid and formed of castings or forgings, so that the weight of the crank hanger as a whole was often considerably greater than was necessary to provide a hanger which was able to withstand the stresses to which the hanger is subjected in ordinary usage. Moreover, the manufacture of such hangers involved the use of complicated and expensive casting and forging equipment.

It is a primary object of the present invention to provide a bicycle crank hanger assembly of novel lightweight construction.

Another object of the invention is to provide a bicycle crank hanger assembly which consists of metal stampings and screw machine parts which can be rapidly produced in commercially desirable quantities by means of readily available equipment, and without the use of cumbersome, expensive, molding and forging equipment.

Other objects and advantages of the invention will be apparent during the course of the following description.

In the accompanying drawings, forming a part of this specification, and in which like numerals are employed to designate like parts through the same, Fig. 1 is a side elevational view of a crank hanger assembly embodying the invention;

Fig. 2 is a cross-sectional view of the crank hanger, taken on the line 2—2 of Fig. 1;

Fig. 3 is a view, partly in section and partly in elevation, taken on the line 3—3 of Fig. 2;

Fig. 4 is an exploded view of one of the pedal hangers;

Fig. 5 is an enlarged transverse cross-sectional view of the pedal hanger, taken on the line 5—5 of Fig. 3; and Fig. 6 is an enlarged transverse cross-sectional view, taken on the line 6—6 of Fig. 3.

In the drawings, wherein for purposes of illustration, is shown a preferred embodiment of the invention, the hanger assembly is seen to comprise a shaft housing consisting of a hollow metallic sleeve 1, which is adapted to be mounted within the opening usually provided therefor in the bicycle frame and secured against rotation within such opening, and cup-shaped cap ends 2 and 3, which are welded or otherwise secured to the sleeve and which prevent axial displacement of the housing.

The caps 2 and 3, in this case, also function as the outer races of ball bearings, which comprise balls 4, and conical inner races 5, the latter being mounted on the spaced enlarged threaded portions 6 and 7 of the shaft 8 of the hanger, which extends centrally through the sleeve 1.

The shaft 8 is machined from ordinary bar or rod stock, and secured to the ends of the shaft which project beyond the aforesaid housing are the pedal hangers 9. These hangers are of novel lightweight construction, and may be described as follows:

Each of the hangers comprises two sheet metal shells, an outer shell 9a and an inner shell 9b which is telescopically fitted into the outer shell so as to form, in effect, a lightweight hollow pedal hanger. Each of the shells is in the form of a sheet metal stamping, of channel-shaped cross-section, and having enlarged circular ends, the ends of the outer shell being designated 9c and 9d, and the ends of the inner shell being designated 9e and 9f. The ends 9c and 9e have aligned central openings 10 and 11 therein, and the ends 9d and 9f have aligned central openings 12 and 13 therein, which are somewhat smaller than the openings 10 and 11. It will be further noted that the ends 9c and 9e of the assembled shells lie in a plane which is offset from but substantially parallel with the plane in which the ends 9d and 9f of the assembled shells lie.

Disposed within the ends 9c and 9e of the assembled shells are bushings 14 having central openings 15 therein which are coaxial with and of the same diameter as the openings 10 and 11 in the shells. This bushing is preferably formed from a number of laminations of sheet metal welded together, these laminations being extended into the hanger, as indicated at 14, so as to increase the resistance of the hanger as a whole to torque stresses. Disposed within the ends 9d and 9f of the assembled shells are bushings 16, which are somewhat smaller than the bushings 14 and have central openings 17 therein which are coaxial with and of the same diameter as the openings 12 and 13 in the shells.

The shells 9a may be welded or otherwise secured to the shells 9b after being assembled therewith, the bushings having been previously press fitted or otherwise rigidly secured within the shells 9b.

The hangers are locked to the shaft 8 by means of tapered pins 17', which extend through the assembled shells 9a and 9b and the bushing 14, and through slots or recesses 18 in the end of the shaft.

One of the hangers is placed in driving engagement with the chain drive sprocket 19 of the bicycle by means of a headed pin 20, the sprocket being mounted on the shaft 8 between the shaft housing and the hanger.

Since the crank shaft housing as well as the hangers are of hollow construction, the overall weight of the crank hanger assembly is reduced to a minimum, without sacrificing strength. Moreover, since virtually all of the parts of the crank hanger assembly are made of simple sheet metal stampings or screw machine products, these parts can be rapidly produced in commercially desirable quantities by means of equipment readily available in the market, and without requiring the use of cumbersome, expensive molding and forging equipment.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A pedal hanger for bicycles and the like, said hanger being of hollow light weight construction, and having a bushing within one end thereof and enclosed thereby, said bushing formed of a plurality of laminations of sheet metal having portions extending into the pedal hanger and engaging the walls thereof to prevent turning of the bushing relative to the hanger.

2. A hollow pedal hanger for bicycles and the like, said hanger comprising a pair of sheet metal stampings of generally channel-shaped cross-section, one of said stampings being telescopically fitted into the other, the ends of the assembled stampings at one end of the hanger lying in a plane which is offset from, but substantially parallel with, the plane in which the ends of the assembled stampings at the other end of the hanger lie, a bushing in one end of the hanger and enclosed thereby, said bushing substantially filling said end and having a portion extending into the hanger and engaging the walls thereof to prevent turning of the bushing relative to the hanger.

3. A pedal hanger for bicycles and the like, said hanger being of hollow lightweight construction and having enlarged circular ends connected by a hollow portion of restricted cross-section, and having a bushing within one end thereof and enclosed thereby, said bushing substantially filling one circular end of the hanger and having a portion extending into the restricted cross-sectional portion of the hanger and engaging the walls thereof to prevent turning of the bushing relative to the hanger.

4. A pedal hanger for bicycles and the like, said hanger comprising a pair of sheet metal stampings secured to each other to form a hanger of hollow construction, said hanger having enlarged circular ends connected by a hollow portion of restricted cross-section, and having a bushing within one end thereof and enclosed thereby, said bushing substantially filling one circular end of the hanger and having a portion extending into said connecting portion of the hanger and engaging the walls thereof to prevent turning of the bushing relative to the hanger.

HERMAN L. KRAEFT.